Figure 4:
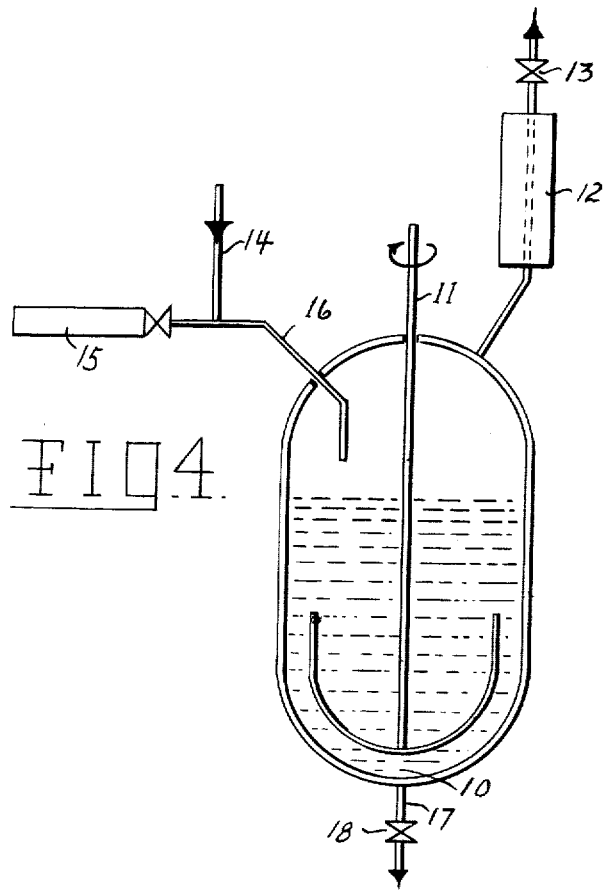

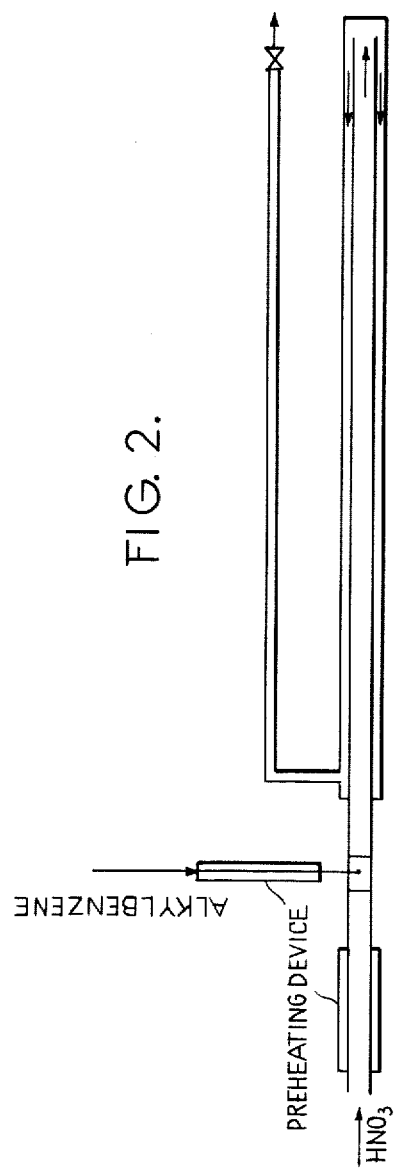

Sept. 24, 1963    B. POPP ETAL    3,105,091
PROCESS FOR THE MANUFACTURE OF CARBOXYLIC ACIDS
Filed Sept. 23, 1957    2 Sheets-Sheet 2

INVENTOR:
BERNHARD POPP
OTTO SCHERER
HANS WOLFRAM
ALFONS STEINMETZ
ADOLF TURK by Richardson, David and Nardon
ATTORNEYS.

3,105,091
PROCESS FOR THE MANUFACTURE OF CARBOXYLIC ACIDS

Bernhard Popp, Otto Scherer, and Hans Wolfram, Frankfurt am Main, Alfons Steinmetz, Kelkheim, and Adolf Turk, Frankfurt am Main, Germany, assignors to Farbwerke Hoechst Aktiengesellschaft vormals Meister Lucius & Brüning, Frankfurt am Main, Germany, a corporation of Germany
Filed Sept. 23, 1957, Ser. No. 685,617
6 Claims. (Cl. 260—524)

It is known in the art to oxidize alkyl substituted aromatic compounds with nitric acid into the corresponding carboxylic acids in a discontinuous or continuous manner under pressure at high temperatures. It is also known that with rising temperature the reaction velocity increases such that it may take place with explosive rapidity. When working according to one of the modes of execution presently applied on an industrial scale, the operation is carried out in a vertical reaction vessel within a temperature range of 160–275° C. and under a pressure of up to 70 atmospheres gage, while higher pressures are to be avoided. The gaseous phase is, moreover, separated from the sump phase in the reaction vessel, and the upper part of the reaction vessel is kept at a considerably lower temperature than the lower part. When employing the latter or similar methods, there are obtained yields per unit of space and time of up to 20 kg./100 l.h. Appreciably higher throughputs and, consequently, larger yields per unit of space and time cannot be attained inasmuch as the elimination of the reaction heat evolved within the unit of time per cubic meter of reaction space cannot exceed an optimum quantity.

Now we have found that alkyl substituted aromatic compounds can be oxidized with special advantage with nitric acid to yield the corresponding carboxylic acids, when the oxidation of, for example, para-xylene or para-chloro-methyl-toluene into terephthalic acid, of meta-xylene into isophthalic acid, of ortho-chlorotoluene into ortho-chloro benzoic acid, of parachloro-toluene into para-chloro-benzoic acid, of para-nitro-toluene into para-nitro benzoic acid, of 2-chloro-4-nitro-toluene into 2-chloro-4-nitro benzoic acid, etc., is carried out at a pressure of at least 80 atmospheres gage in a homogeneous solution in an approximately horizontal flow pipe (designated here and hereinafter as "zone of flow"). The horizontally arranged flow pipe is the most favorable installation for carrying through reactions of this kind, in the course of which a mixing motion in the liquid phase takes place necessarily owing to the liberated reaction gases. The difference as compared with other prior art methods lies in the fact that the reactants and the reaction products are conducted horizontally, which results in the slightest possible mixing motion in a direction parallel to the flow direction of the reactants, and therewith also in the narrowest contact time distribution for the reaction. When choosing the speed of flow, calculated upon the reactants employed, it is in many instances advantageous to operate within the turbulent range. In the interest of obtaining a contact time distribution which is as narrow as possible, it is recommended to adjust the flow speed of the reaction mixture in the flow pipe to a rate (calculated in cm./sec.) which is of a magnitude of at least five times the inner radius (in cm.) of the flow pipe (zone of flow) multiplied by the number of oxidizable carbon-alkyl-atoms, that is to say in case of two oxidizable C-alkyl atoms (xylene, ethyl benzene) at least ten times, and in case of three oxidizable C-alkyl atoms (propyl benzene, methyl-ethyl benzene) at least 15 times the inner radius of the flow pipe. Thus the following relation should be maintained: flow speed $\geqq 5$ times the number of the alkyl carbon atoms multiplied with the inner radius of the flow pipe. It is, furthermore, possible to choose the diameter of the flow pipe larger in that section of the pipe which follows the main reaction zone.

Since the reaction velocity increases very much particularly at temperatures above 230° C., it is advantageous to perform the oxidation within a temperature range of 230°–350° C. The reaction is, as a rule, carried out such that the substance to be oxidized is brought into contact with nitric acid which has been preheated to a sufficiently high temperature, for example 170° C. The reaction heat evolved during the following spontaneous reaction is not eliminated but used first to heat the reaction mixture to temperatures above 210° C., in the course of which operation the initial substances to be oxidized, for example hydrocarbons, react in such a manner that soluble products are formed. When carrying out the process at temperatures exceeding 230° C., preferably 240–280° C., there is—in addition to the extremely high reaction velocity which was to be expected—derived the further advantage that also the solubility of the reaction products, which are difficultly soluble in dilute nitric acid, increases to such an extent that homogeneous solutions are obtained while the degree of dilution is still economical. Thus, for example, the solubility of terephthalic acid in dilute nitric acid rises within a temperature range of 230°–260° C. from about 2% to about 10%, while within the range of 200°–230° C. there is only observed an increase from 1% to about 2%. When choosing a concentration which corresponds to the solubility of the reaction product in dilute nitric acid, considerable technical difficulties due to the separation of insoluble reaction products can be avoided with certainty. Furthermore, the dissolved reaction product is not capable of surrounding the intermediate products which have not been completely reacted, thus excluding them from further reaction. When using the known processes, the components which are still in the gaseous phase and whose reaction has not yet been completed, must be returned by washing and condensation at considerably lower temperatures since they would otherwise escape from the reaction chamber together with the reaction gases. When using the arrangement according to the invention, however, the reaction gases which have formed are conducted to the end of the reaction zone together with the liquid, at the same temperature. It is, therefore, possible according to the process of the invention, to effect the oxidation of, for example, para-xylene into terephthalic acid with a contact time of down to about 30 sec. and, nevertheless, to achieve a conversion of 100%. Consequently, very high yields per unit of space and time are obtained. It is, moreover, recommended to choose the flow speed of the reaction mixture the higher the larger the cross section of the flow pipe in order to facilitate temperature control.

When carrying out the reaction in a flow pipe there is achieved—in contrast to other reaction vessels such as autoclaves—such a favorable surface: volume ratio owing to the elongated shape of the pipe having a comparatively small diameter, that hereby only there is ensured a safe control of the temperature and, consequently, of the course of the reaction by means of regulating the temperature, while simultaneously high yields per unit of space and time are obtained. When allowed to expand, the reaction mixture cools off while the reaction products, such as terephthalic acid, crystallize and can be isolated from the liquid by mechanical separation.

It is expedient to choose the pressure as high as possible because the space taken up by the reaction gases becomes smaller with the increasing pressure and, owing thereto, the effective contact time of the reacting components increases. Moreover, when using a high pressure, the quantity of alkyl benzene in the gaseous phase decreases, which also results in higher yields.

Figure 3:
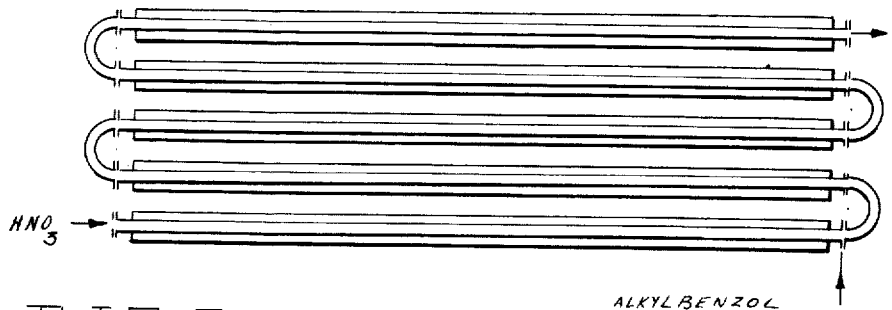

According to the present invention, a separation of the exhaust gases from the aqueous solution in the reaction pipe is to be avoided as far as possible. For this purpose it is necessary to maintain in the flow pipe a pressure within the range of 80–250 atmospheres gage, preferably at least 90 atmospheres gage, for example 120 atmospheres gage, which flow pipe, in order to achieve a better utilization of space, may be bent so as to form units which are arranged side by side or one above the other, the straight sections of the pipe always being arranged approximately horizontally (FIG. 3). When putting through the same quantity of the reaction mixture, a pressure of below 80 atmospheres gage leads to a worse utilization of the oxidation agent; simultaneously therewith the portion of the starting material, whose reaction has not been completed in the reaction product, increases.

When performing the reaction according to the process of the invention, there is obtained an absolute safety against explosion accidents, since the exhaust gas separated after the expansion only contains small amounts of about 1–5% of nitrous oxide which is known to lead to very heavy explosions when coming into contact with vapors of hydrocarbons. The water necessary for obtaining a homogeneous solution is suitably introduced into the flow pipe in the form of dilute nitric acid, the concentration of the nitric acid to be determined corresponding to the solubility of the reaction product in water and/or dilute nitric acid at about reaction temperature. The process claimed renders it possible to operate with initial concentrations of nitric acid of about 1% to about 50%, preferably with concentrations of about 10% to about 30% since, when working, for example, within the cited temperature range of at least 230° C. or higher, 1% by weight of nitric acid in the reaction mixture still has a sufficient oxidizing action.

With respect to heat technology, the reaction may, for example, be carried out in the following manner (FIG. 1):

The components nitric acid and organic starting material, for example alkyl benzene, are preheated (preheating device) and then introduced into the reaction pipe where the heating is continued (heating device) in order to accelerate the reaction; in the zone of the greatest reaction velocity heat is dissipated by cooling means (cooling device). By means of a further heating device the reaction mixture is kept at the reaction temperature in order to complete the reaction. The reaction heat may also be used in order to heat the reaction mixture by working on the countercurrent principle (FIG. 2).

For the purpose of a better utilization of space, the reaction pipe may also be bent such that it forms a multiple hairpin arrangement in series, the straight sections of which may be arranged one above the other, side by side or in a bundle (FIG. 3). The straight sections of the pipe shall then always be arranged in an approximately horizontal position.

According to the process of the present invention, there may be oxidized, for example, mononuclear alkyl substituted compounds containing at least one straight-chained or branched alkyl group directly bound to the nucleus, such as methyl, ethyl, propyl, isopropyl, butyl, isobutyl, pentyl, hexyl, decyl, dodecyl, whose total number of carbon atoms does not exceed 20, or a substituted alkyl group, such as chloromethyl. There may also be used other organic compounds such as tetrahydronaphthalene yielding benzene-mono- or polycarboxylic acids in the course of the nitric acid oxidation. Thus the corresponding carboxylic acids can be obtained, for example, from toluene, various chloro- and bromo-toluenes, various nitrotoluenes, xylenes, including ortho-, meta- and para-xylene, various nitro-, bromo- and chloro-xylenes, sulfonic acids, such as toluene sulfonic acid, pseudo-cumene sulfonic acid, from mesitylene, pseudo-cumene, from ethyl benzene, methyl-ethyl benzene, propylbenzene, di-isopropyl-benzene, cumene, cymenes, from toluyl acids, from chloro-methyl compounds, such as xylylene-dichloride or aldehyde benzoic acids, or from the derivatives of these acids, such as the esters etc. Of the compounds mentioned those starting products are the most important which yield para- or meta-dicarboxylic acid, mainly iso- and terephthalic acid. It is, however, also possible to prepare carboxylic acids having three or more carboxyl groups from chloro-methylation products, for example from xylene.

It has been found, moreover, that the carboxylic acids obtained according to the above process, inasmuch as they have a solubility of less than about 1% at temperatures of 100° C., can be obtained in an especially pure and easily filterable form when the homogeneous reaction solutions, which are kept under pressure and at a high temperature and which are obtained according to the above process, are first partially expanded to a pressure of 1–50 atmospheres gage, and then, after an average contact time of about 15 seconds to about 60 minutes in which filterable crystals are formed, to atmospheric pressure, and the easily filterable crystals thus obtained are isolated according to the usual method.

When the reaction solution obtained according to the above process is expanded to atmospheric pressure in one stage, the solution cools off to a high degree, and the carboxylic acids which are relatively difficultly soluble in aqueous nitric acid precipitate rapidly in the form of crystals of such a fineness that they can be filtered with great difficulty only. The fine crystals, moreover, adsorb a great quantity of impurities which cannot be washed out and much more water than coarser crystals. Thus, upon direct expansion to atmospheric pressure, the purity of a terephthalic acid prepared according to the above process amounts to 94% while a purity of 97–99% is attained when carrying out the expansion in stages according to the process of the invention. This separation can, for example, be carried out in an apparatus as illustrated in FIG. 4. Following the apparatus shown in FIGS. 1–3, there is arranged an interposed pressure-vessel 10, into which the homogeneous reaction solution is introduced together with the reaction gases. This intermediate vessel may be provided with a stirrer 11 and permits expansion of the exhaust gases via a condenser 12 and a valve 13. The cooling in the intermediate vessel may be effected by adding water via pipe 14 to the completely reacted mixture, which is discharged from reaction pipe 15 via conduit 16. It is, however, also possible to run water into the intermediate vessel 10 direct. The crystalline suspension which has formed is discharged via conduit 17 and valve 18. The exhaust gases from the intermediate vessel which, when employing the nitric acid—or the nitric acid-air-oxidation process—consist mainly of nitric oxides or contain a considerable portion of these oxides are simultaneously expanded via a cooler. There is suitably chosen an inlet temperature at the intermediate vessel which, depending on the acid used, is about 10°–100° C. lower than the reaction temperature which, for example, may be higher than 250° C.; in case of aqueous solutions of terephthalic acid or solutions of terephthalic acid combined with nitric acid, the preferred range lies between 215–230° C. which can be adjusted for example, by pumping water at 100 to 200° C. into the reaction mixture. Owing to the dilution of the reaction medium by water, there are obtained crystals of an appreciably higher purity. In the intermediate vessel the crystallization is completed by further cooling caused by expansion of the reaction gases to the desired pressure. When using the same contact time, the grain size of the crystals depends on the established pressure in the intermediate vessel and increases with the rising pressure. When especially easily filterable crystals are desired, the reaction gases have to be separated before they are completely expanded. When, however, the process is carried out without this separation of the reaction gases, there is observed a much smaller crystallization effect than when working at an expansion stage similar to that described above. The different grain sizes of the crystals may also be inferred from the water content of the crystal cake. Thus, when using a contact time of about 15 minutes, the water content of a terephthalic acid which was prepared according to the process of the invention and which had been filtered off with suction amounted to 60–70% when directly expanding to atmospheric pressure, to 35–45% when effecting the expansion in stages to 15–30 atmospheres (gage) without the separation of gases, and to 15–20% when effecting the expansion in stages to 15–30 atmospheres (gage) with the separation of gases, depending on the established pressure.

The continuous discharge of the crystalline suspension proceeds advantageously when the expansion in the intermediate vessel to atmospheric pressure is effected by expansion evaporation or by pumping cold water into the reaction mixture.

The grain size of the crystals can easily be regulated since, when using the same contact time, it depends on the established pressure and, consequently, on the temperature in the intermediate vessel and increases with the rising pressure. Advantageously, the residence time may be so chosen within the range of 15 seconds to 60 minutes such that the product of the pressure, measured in atmospheres, and the predominant particle size, measured in microns, has a value from about 30 to about 5000, the pressure being within the range of about 1 to about 40 atmospheres (gauge). When directly expanding a solution of para-nitro-benzoic acid, prepared by the above process, there are obtained crystals having predominantly a particle size of 20µ; when the temperature in the intermediate vessel is set at 125° C., the crystals have predominantly a particle size of 30µ, and at a temperature of 140° C. of 70µ. When separating para-nitrobenzoic acid, it is especially advantageous to operate at a pressure of 2–5 atmospheres gage in the intermediate vessel with a contact time of about 15 minutes.

This process is especially advantageous when employing terephthalic acid and para-nitrobenzoic acid, but it can also be used in case of other acids, such as isophthalic acid and para-chlorobenzoic acid. Thus, when using isophthalic acid and para-chlorobenzoic acid and carrying out the expansion in stages to 4 atmospheres gage, there are obtained crystals having predominantly a particle size of 20–30µ, as compared with a grain size of 10µ in case of effecting the expansion direct.

*Example 1*

400 l. of nitric acid of 15% strength having a temperature of 170° C. and 24 l. of para-xylene of room temperature are pumped per hour into a flow pipe having an overall length of 42 m. and an inside diameter of 24 mm, while a pressure of about 100 atmospheres gage is maintained in the pipe by means of an expansion device installed at the end of the pipe. The reaction mixture consisting of $HNO_3$ and para-xylene is heated up to a temperature ranging from 240–260° C. by externally heating the flow pipe, while the reaction proceeds very rapidly. In the following sections of the flow pipe comprising the major part of the apparatus, there is maintained a temperature of 250° C. Upon expansion the terephthalic acid crystallizes from the nitric acid, which still has a strength of about 3%, with a purity of 94–95% and a yield amounting to 90% of the theoretical yield. The yield per unit of space and time amounts to 153 kilos of terephthalic acid/100 l.h.

*Example 2*

300 l. of nitric acid of 15% strength having a temperature of 180° C. and 35 l. of ortho-chlorotoluene of room temperature are put through the same apparatus per hour, as described in Example 1, while maintaining a pressure of about 100 atmospheres gage. By externally heating the pipe, the reaction mixture is heated to 220–240° C. and kept at this temperature. After expansion, ortho-chlorobenzoic acid crystallizes with a purity of 95% and with a yield of 80%.

*Example 3*

160 l. of nitric acid of 15% strength having a temperature of 190° C. and 20 l. of 2-chloro-4-nitrotoluene of 80° C. are put through the same apparatus per hour as described in Example 1, while a pressure of about 100 atmospheres gage is maintained. By heating the flow pipe externally, the reaction mixture is heated to 240–260° C. and is kept within this range of temperature. After expansion, 2-chloro-4-nitrobenzoic acid separates in the form of a heavy oil which congeals when being cooled. The purity of the acid is 95% and the yield was 80% of the theoretical yield.

*Example 4*

23 l. of nitric acid of 15% strength having a temperature of 160° C. and 1.25 l. of para-xylene of room temperature are pumped per hour into a pipe having a length of 15 m. and an inside diameter of 10 mm., while a pressure of about 100 atmospheres gage is maintained in the pipe by means of an expansion device installed at the end of the pipe. By externally heating the pipe, the reaction mixture is heated to 240–255° C., while the reaction proceeds very rapidly. This temperature is maintained until the reaction mixture has reached the end of the pipe. After expansion, terephthalic acid crystallizes from the nitric acid which still has a strength of about 5% with a purity of 91–92% and in a yield amounting to 87% of the theoretical yield.

When carrying out a control experiment under the same conditions but under a working pressure of only 40 atmospheres gage, the purity of the terephthalic acid obtained is 78%, and the yield is 63% of the theoretical yield.

*Example 5*

282 l. of nitric acid of 15% strength having a temperature of 175° C. and 30 l. of para-nitrotoluene of 80° C. are pumped per hour into a flow pipe (FIG. 2) having an overall length of 42 m. and an inside diameter of 26 mm., while a pressure of about 100 atmospheres gage is maintained in the pipe by means of an expansion device installed at the end of the pipe. In the heat exchanger, which is arranged immediately after the inlet tube through which the para-nitrotoluene is admitted, the temperature rises up to 260° C. owing to the reaction heat. After the reaction has started, an external application of heat is no longer required. In the following sections of the flow pipe a temperature of 230° C. is maintained. Upon expansion, para-nitrobenzoic acid crystallizes from the nitric acid which still has a strength of about 5–6% in a yield of 90% of the theoretical yield and a purity of more than 99%. The yield per unit of time and space amounts to 160 kilos of para-nitrobenzoic acid/100 l.h.

*Example 6*

A solution of para-nitrobenzoic acid obtained as described in Example 5, which is kept under a pressure of 100 atmospheres gage in the reaction pipe and has a temperature of 230° C., is continuously expanded in an intermediate vessel. This intermediate vessel is equipped with a reflux condenser. Via this condenser the exhaust gases are expanded such that the pressure in the vessel is reduced to 3 atmospheres gage. When the liquid in the vessel has attained a level which corresponds to a medium time of stay of 15 minutes, the suspension of the crystalline para-nitrobenzoic acid in dilute $HNO_3$ is discharged from the vessel in proportion to the quantity added. The predominant particle size of the crystals is 40μ. In contrast thereto, the grain size amounts to only 20μ when the expansion from 100 atmospheres gage to atmospheric pressure is effected direct.

*Example 7*

A solution of terephthalic acid of about 7.5% strength in nitric acid of about 3% strength in a reaction pipe, which is under a pressure of 100 atmospheres gage and has a temperature of 250° C., is continuously expanded in an intermediate vessel. This intermediate vessel is equipped with a reflux condenser. Via this condenser the exhaust gases are expanded such that the pressure in the vessel is reduced to 20 atmospheres gage. When the liquid in the vessel has attained a level which corresponds to a medium time of stay of 15 minutes, the suspension of the crystalline terephthalic acid in dilute nitric acid is discharged from the vessel in proportion to the quantity added. The crystals have a medium grain size of 10–30μ. In contrast thereto, the grain size of the crystals is below 1μ when the expansion from 100 atmospheres gage to atmospheric pressure is effected direct.

We claim:

1. A process for oxidizing an alkyl substituted benzene, the alkyl substituents of which have up to 20 carbon atoms, to a benzene carboxylic acid having at least one carboxyl group directly attached to the benzene ring, which comprises reacting said benzene with aqueous nitric acid having a concentration of about 1 percent to about 50 percent by passing an initially two-phase reaction mixture of said aqueous nitric acid and said benzene through a substantially horizontal tubular reaction zone at a pressure within the range of 80 to 250 atmospheres and at a temperature within the range of 210° C. to 350° C.

2. A process as defined in claim 1 wherein the reactants are passed through the reaction zone at a pressure of about 90 to about 120 atmospheres and at a temperature within the range of about 240° C. to about 280° C., and the nitric acid has an initial concentration within the range of about 10 percent to about 30 percent.

3. A process as defined in claim 1, wherein the value of the flow speed of said reaction mixture, in centimeters per second, is at least equal to that value obtained by multiplying the number 5 with the value, in centimeters, of the inner radius of said tubular reaction zone, and with the number of alkyl substituents in the alkyl benzene.

4. A process for oxidizing an alkyl-substituted benzene, the alkyl substituents of which have up to 20 carbon atoms, to a benzene carboxylic acid having at least one carboxyl group attached to the benzene ring which comprises reacting said benzene with aqueous nitric acid having a concentration of about 1 percent to about 50 percent by passing an initially two-phase reaction mixture of said aqueous nitric acid and said benzene through a substantially horizontal tubular reaction zone at a pressure within the range of 80 to 250 atmospheres and at a temperature within the range of 210° C. to 350° C., releasing the reacted mixture upon discharge from said reaction zone to a pressure within the range of about 1 to 50 atmospheres (gauge) and maintaining it under this pressure for from about 15 seconds to about 60 minutes.

5. A process for oxidizing a para-dialkyl benzene, the alkyl groups of which have up to 20 carbon atoms, to terephthalic acid which comprises reacting said benzene with aqueous nitric acid having a concentration of about 1 percent to about 50 percent by passing an initially two-phase reaction mixture of aqueous nitric acid and the said para-dialkyl benzene through a substantially horizontal tubular reaction zone at a pressure within the range of 80 to 250 atmospheres and at a temperature within the range of 210° C. to 350° C., releasing the reacted mixture upon discharge from said reaction zone to a pressure within the range of about 15 to about 30 atmospheres (gauge) and releasing this mixture to atmospheric pressure as soon as conveniently filterable crystals have been formed.

6. A process for oxidizing an alkyl para-nitrobenzene, the alkyl group of which has up to 20 carbon atoms, to p-nitrobenzoic acid which comprises reacting said benzene with aqueous nitric acid having a concentration of about 1 percent to about 50 percent by passing an initially two-phase reaction mixture of said aqueous nitric acid and the said para-substituted nitrobenzene through a substantially horizontal tubular reaction zone at a pressure within the range of 80 to 250 atmospheres and within a temperature range of 210 to 350° C., releasing the reacted mixture upon discharge from said reaction zone to a pressure within a range of about 2 to about 5 atmospheres (gauge) and releasing this mixture to atmospheric pressure as soon as conveniently filterable crystals have formed.

References Cited in the file of this patent

UNITED STATES PATENTS

| | | |
|---|---|---|
| 2,636,899 | Burrows et al. | Apr. 28, 1953 |
| 2,722,553 | Muller et al. | Nov. 1, 1955 |
| 2,860,162 | Ekenstam | Nov. 11, 1958 |

FOREIGN PATENTS

| | | |
|---|---|---|
| 662,229 | Great Britain | Dec. 5, 1951 |
| 698,734 | Great Britain | Oct. 21, 1953 |
| 747,417 | Great Britain | Apr. 4, 1956 |

UNITED STATES PATENT OFFICE
CERTIFICATE OF CORRECTION

Patent No. 3,105,091                  September 24, 1963

Bernhard Popp et al.

It is hereby certified that error appears in the above numbered patent requiring correction and that the said Letters Patent should read as corrected below.

In the heading to the printed specification, between lines 10 and 11, insert the following:

Claims priority, application Germany Sept. 25, 1956

Signed and sealed this 7th day of April 1964.

(SEAL)
Attest:

ERNEST W. SWIDER

Attesting Officer

EDWARD J. BRENNER

Commissioner of Patents